United States Patent [19]

Banko et al.

[11] 3,774,984

[45] Nov. 27, 1973

[54] CABINET STRUCTURE

[75] Inventors: Ronald C. Banko, Cherry Hill, N.J.; Thor F. Olsony, Taipei, China /Taiwan

[73] Assignee: Philco-Ford Corporation, Blue Bell, Pa.

[22] Filed: Aug. 23, 1972

[21] Appl. No.: 282,972

[52] U.S. Cl. ............... 312/8, 220/4 F, 312/257 SK, 312/284

[51] Int. Cl. ........................ A47b 8/06, A47b 43/00

[58] Field of Search................ 312/7, 8, 208, 257 R, 312/257 SK, 263, 330, 284; 220/4 F, 22

[56] References Cited

UNITED STATES PATENTS

| | | | |
|---|---|---|---|
| 2,942,749 | 6/1960 | Rosenberg | 220/4 F |
| 2,973,602 | 3/1961 | Nessel | 312/208 |
| 2,701,174 | 2/1955 | Franks | 312/330 X |
| 3,004,814 | 10/1961 | Schulze | 312/257 R |

*Primary Examiner*—Casmir A. Nunberg
*Attorney*—Robert D. Sanborn et al.

[57] ABSTRACT

Cabinet structure assemblable in a number of different sizes, from a minimum number of major parts, whereby to house audio components in various combinations. The cabinet of the invention is featured by the use of a pair of rigid rails having a given spacing defining the front-to-back dimension of the cabinet, and being of a length to define the side-to-side dimension desired in a particular cabinet. A pair of end caps cooperate with the rail ends to maintain the latter in spaced relation. The end caps, floor structure, audio components, and cover means for the latter, are all supported by the pair of rails.

1 Claim, 6 Drawing Figures

CABINET STRUCTURE

BACKGROUND OF THE INVENTION

In the manufacture of individual audio components, and various assemblages of the same, it has been common to design each component and its cabinetry individually. This has resulted in considerable and unnecessary expense since the major parts of the different cabinets are not interchangeable and the same parts cannot be used in the manufacture of a variety of different arrangements.

There is increasing emphasis on flexibility in scheduling the manufacture of cabinets and, as will be understood, interchangeability of basic cabinet parts would effect substantial cost savings.

SUMMARY OF THE INVENTION

In general, it is the objective of our invention to render the manufacturing operation much more flexible, in order that the proper manufacturing mix of desired components can be arrived at without excessive tooling or multiplication of individual cabinet parts.

In the achievement of this objective we provide standardized cabinet frame elements. Particularly, we have conceived of cabinet structure in which a pair of front and rear rails are used in manufacture of a wide variety of audio components and assemblages. The rails for one cabinet differ only in length from the rails of another. It is characteristic of the invention that these rails, or main frame members, support the entire cabinet and the components mounted therein. Since the front-to-back spacing of the rails remains the same in every cabinet arrangement, use of suitable end pieces, or caps, which are identical in each cabinet, and selection of an appropriate component, makes it possible to house a wide variety of component arrangements. Basically, the rigid rails which support the structure are selected, as to length, in accordance with the component or components which are to be housed. Perhaps the best indication of the versatility of the cabinet structure which we have devised is the fact that it is possible to manufacture about a dozen or more audio combinations by selecting, for assembly, only about thirteen major cabinet parts.

In summary, the apparatus of the invention is featured by the fact that it has a predetermined form factor as to one major dimension (front-to-back) and may be assembled in a range of sizes as to the other major dimension (side-to-side).

It will be observed that in each of the cabinet arrangements illustrated in FIGS. 2 through 6 the rigid support rails are identical, except as to length, the end caps are mirror images of each other, and the floor structure varies only as to length. Suitable center supports, or adaptors, used in combination with cover structure, complete the assemblages.

DESCRIPTION OF THE ILLUSTRATED STRUCTURE

Figures 1, 2:
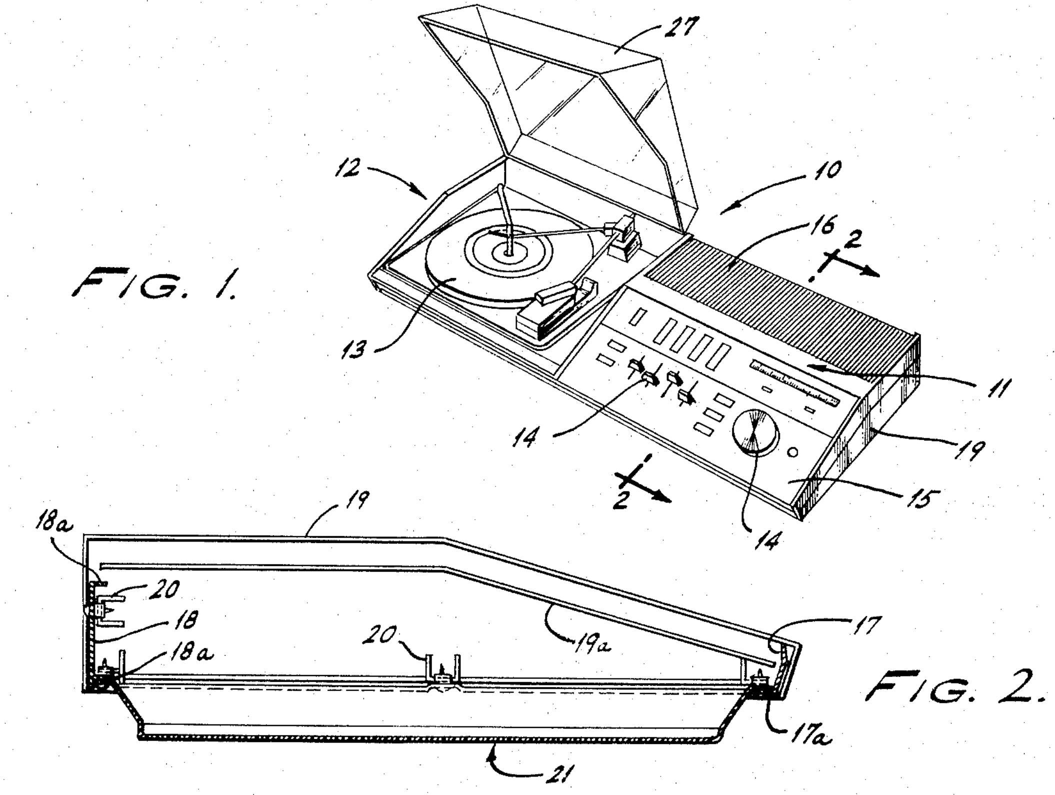
FIG. 1 is a perspective illustration of a representative audio component assembly which may be constructed in accordance with the invention. In this case the assembly comprises a radio-phonograph combination.
FIG. 2 is a cross-sectional view looking in the direction of the line 2—2 applied to FIG. 1, and with the radio component omitted for the sake of clarity in illustrating the cabinet. The front and back support rails appear in section in this view, as does the bottom pan, while an end cap is shown in elevation.

In the apparatus illustrated in the drawings, and first with reference to FIG. 1 thereof, the radio-phonograph combination comprises a radio cabinet 11 (the right hand side of the illustrated assembly), and a phonograph, and its cabinet 12 (the left hand portion thereof). The phonograph appears at 13 and elements of the radio are seen at 14. It will be appreciated that, so far as this invention is concerned, these audio components may be of any desired type.

The cabinet has a downwardly and forwardly tapered portion 15, which, in the embodiment of FIG. 1, provides a mounting for the controls of the radio. If desired, speakers may underlie the fluted portion 16.

Figure 3:
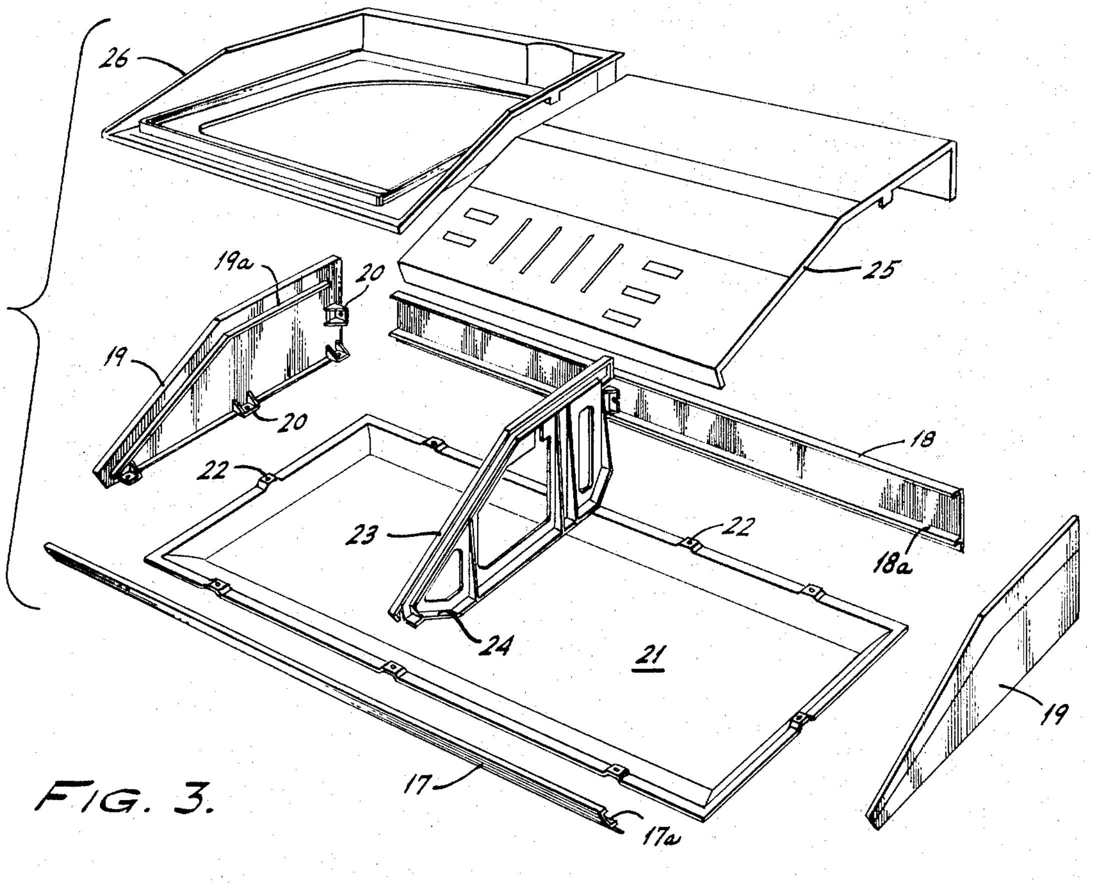
FIG. 3 is an exploded perspective illustration showing the individual pieces from which the cabinet of FIGS. 1 and 2 is constructed.

In accordance with our invention, and with particular reference to FIGS. 2 and 3, the cabinet structure comprises rigid front and rear rail members 17 and 18 each of which is configured, as by the use of flanging shown at 17*a* and 18*a*, to provide support for the components housed within the cabinet. The particular way in which the components are associated with these rigid support rails need not be shown in detail. However, by way of example, FIG. 2 shows the manner in which the floor pan is supported and also illustrates several bracket members which form part of the end cap structure 19. This bracket structure appears at 20—20 in FIG. 2. The end caps are of similar construction, may conveniently be molded of plastic material, and have any desired finish. Each cap includes a strengthening rib 19*a*. The nature of these end caps will readily be understood from a consideration of FIG. 3. When the front and rear rails 17 and 18 are suitably secured to the end caps 19—19, by means of the illustrated brackets and screw members (FIG. 2), there results a rigid frame structure which is capable of supporting the entire apparatus.

The floor 21, of pan-like configuration, underlies the entire cabinet and is provided with suitable bosses 22, providing for convenient association of the floor with the sub-assembly comprised of the rails and end caps. As a part of the detail shown at 18a in FIG. 2, it will be seen that sheet metal screws may be used for this purpose. The floor may be of metal, or of a plastic material, depending upon the overall design objectives.

Where, as is the case in the embodiment shown in FIGS. 1–3, more than a single audio component is to be housed in the cabinet, an intermediate framing member, or adapter, is provided. Such an adapter is shown at 23 in FIG. 3. As will be seen, it repeats the cross-sectional configuration defined by the end cap 19, except that it preferably includes a lower portion 24 which depends within the pan-like floor member 21. When all of the illustrated pieces are suitably secured, there results a cabinet suitable for housing the audio components shown in FIG. 1. The entire assemblage is then completed by installing the components and providing suitable cover means. In the illustrated embodiment the cover means takes the form of an angular cover member 25 (FIG. 3) which overlies the radio and is suitably apertured to provide for disposition and operation of the radio controls. The phonograph is conveniently mounted in an enclosure, preferably of clear plastic, the lower portion 26 of this enclosure rests upon the rails, within the left hand portion of the cabinet, while the upper portion comprises a dust cover 27 (FIG. 1).

The versatility of the apparatus of this invention will be understood from inspection of the relatively few cabinet elements required to manufacture several of the various audio component arrangements contemplated by the invention. In the diagrammatic showing of FIG. 4, front and rear rails **17*b* and 18*b* are shown, these rails being of the length required to fabricate a cabinet adapted to house a radio only. In view of the shortness of the cabinet, no center adapter is needed and provision of a shortened pan 21*a*, and of the standard end caps 19—19, completes the cabinet which then only requires the cover member shown at 25. It will be observed that the rails and the floor differ from the embodiment of FIGS. 1–3** only as to length, and that the end caps are identical.

Figures 4, 5, 6:
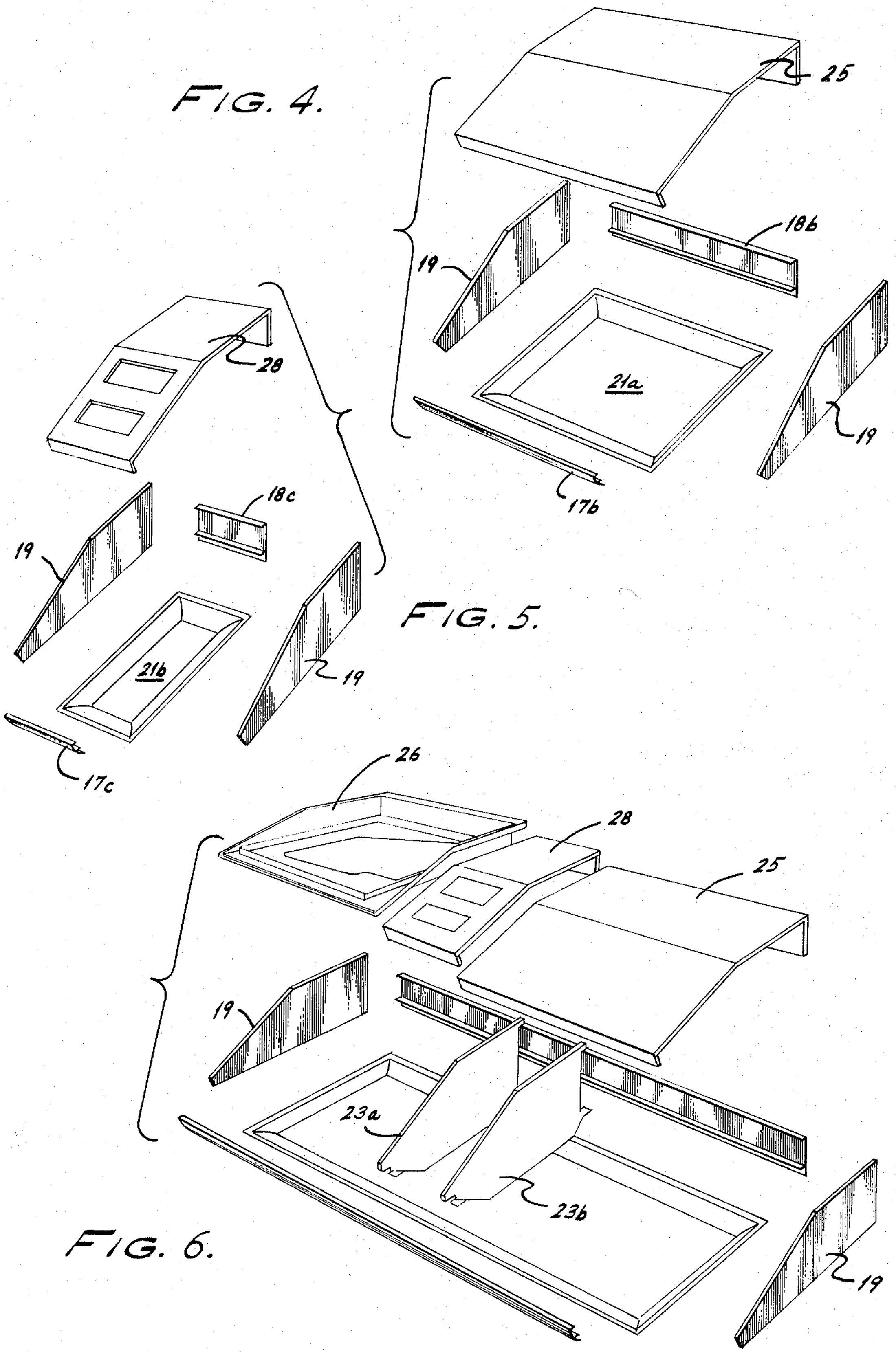
FIG. 4 is a somewhat diagrammatic figure illustrating the individual pieces which are required to manufacture a radio receiver cabinet.
FIG. 5 is a somewhat diagrammatic view, similar to FIG. 4, and showing the pieces utilized in the manufacture of a cabinet for a cassette recorder.
FIG. 6 is a view similar to FIGS. 4 and 5 and illustrating the individual pieces employed in the manufacture of a cabinet intended to house a radio-phonograph-cassette recorder combination.

If it is desired to produce a short cabinet such as that shown in FIG. 5, rails **17*c* and 18*c* are shown with a length required to house smaller apparatus, for example a tape deck. These shorter rails cooperate with a laterally shortened floor 21*b*. Again, the end caps 19 are used. Provision of a cover 28**, suitably apertured to accommodate the tape function, completes the assembly.

Another representative arrangement which may be constructed, utilizing the basic components of this invention, is illustrated in FIG. 6. This arrangement differs from that shown in FIGS. 1–3 in that the cabinet is intended to house a tape deck in the center portion thereof, as well as the radio and phonograph shown in the embodiment first described. With this purpose in mind, the rail and floor pan are increased in length a distance sufficient to accommodate the three components (not illustrated). The tape deck would be mounted between the two dividers shown more or less diagrammatically at **23*a* and 23*b*. Cover means characteristic of radio, tape and phonograph use are shown, respectively, at 25, 28 and 26**.

The various cabinet arrangements of FIGS. 4 through 6 are shown more or less diagrammatically and, in exploded perspective illustration. However, it will be understood that the individual parts would preferably have the desired configuration shown in greater detail in FIG. 3, and that all the components would be secured together, by use of any suitable fastening means, thereby forming a rigid cabinet.

The bottom pan is not relied on for structural strength or rigidity. Accordingly, the apparatus of our invention is also featured by the fact that the audio units, and combinations thereof, may be completely assembled without the base pan for subsequent installation in console equipment.

We claim:

1. Cabinet structure for housing audio components and having one predetermined major dimension, and being characterized by the capability of being embodied in any one of a range of sizes which differ as to another major dimension, said cabinet structure comprising: a pair of rigid, generally parallel, rail members having a given spacing, front-to-back of the cabinet structure, defining said one dimension, being of unequal height and of a length to define the side-to-side dimension desired in the cabinet structure; a pair of rigid cabinet end members each carried by a pair of rail ends, said end members establishing said front-to-back spacing and being of tapered shape to define in said cabinet a front-to-back cross-sectional configuration such that an upper portion of the cabinet is angled downwardly toward the rail member of shorter height; a pan-like cabinet floor member secured to and depending from said rigid end and rail members; means extending from said rail members inwardly of said cabinet and providing for support, within the cabinet structure, of audio component means from said rigid rail members; and cabinet cover means extending across the space between said rail members and supported from the same, said cover means being comprised of a pair of adjacent covers each supported on said rail members so as to present a downwardly and forwardly angled upper surface, said covers further being constructed and arranged to provide for control of such audio component means as may be supported within said cabinet structure.

* * * * *

PO-1050
(5/69)

UNITED STATES PATENT OFFICE
CERTIFICATE OF CORRECTION

Patent No. 3,774,984 Dated November 27, 1973

Inventor(s) Ronald C. Banko and Thor F. Olson

It is certified that error appears in the above-identified patent and that said Letters Patent are hereby corrected as shown below:

In the title page, left hand column, item [75], the name "Thor F. Olsony" should read -- Thor F. Olson --.

Signed and sealed this 2nd day of April 1974.

(SEAL)
Attest:

EDWARD M.FLETCHER,JR.
Attesting Officer

C. MARSHALL DANN
Commissioner of Patents